US007802297B2

(12) United States Patent
Bennett et al.

(10) Patent No.: US 7,802,297 B2
(45) Date of Patent: Sep. 21, 2010

(54) KEYBOARD WITH BUILT IN DISPLAY FOR USER AUTHENTICATION

(75) Inventors: James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1434 days.

(21) Appl. No.: 11/135,458

(22) Filed: May 23, 2005

(65) Prior Publication Data

US 2006/0179322 A1 Aug. 10, 2006

Related U.S. Application Data

(60) Provisional application No. 60/650,688, filed on Feb. 7, 2005.

(51) Int. Cl.
*H04L 29/00* (2006.01)

(52) U.S. Cl. .................... 726/19; 726/5; 726/6; 726/7; 726/18

(58) Field of Classification Search ...................... None
See application file for complete search history.

(56) References Cited

U.S. PATENT DOCUMENTS 6,701,357 B1 * 3/2004 Astarabadi et al. .......... 709/220
7,383,061 B1 * 6/2008 Hawkins .................. 455/556.2
2006/0068760 A1 * 3/2006 Hameed et al. .......... 455/412.1

OTHER PUBLICATIONS

"Set Up a Home Network", Kelso Consulting Group, 2004, pp. 1-5, 29-45, 83-89.*
"Using Your Bluetooth Laptop with the Logitech Wireless Hub", Logitech, 2003, pp. 1-19.*
Ryder, "Protecting Information on a Stolen Laptop", Aug. 2001.*

* cited by examiner

*Primary Examiner*—Minh Dinh
(74) *Attorney, Agent, or Firm*—Garlick Harrison & Markison

(57) ABSTRACT

A method and apparatus are provided for creating a personal area network with a wireless keyboard, comprising generating a text message on a keyboard integrated display to prompt a user to enter a password, determining all available personal area network devices and displaying a subset of the available personal area network devices based upon access permissions associated with the password. Generally, the wireless keyboard includes logic for generating prompts to a user to create a master password and user passwords with defined access privileges. Moreover, a user, by utilizing the display, may select alternate or additional devices with which to couple. In one embodiment, the wireless keyboard is further operable to send and receive text messages with a cell phone which are further propagated through a cellular network using legacy text message protocols.

17 Claims, 8 Drawing Sheets

| PASSWORD | DEVICES | ACCESS PRIVILEGES |
| --- | --- | --- |
| A1B0 | keyboard | create/delete user accounts<br>and associated passwords |
| A1B1 | cell phone | read contacts<br>send/receive txt msgs |
| | desktop 1 | read document files<br>access Internet |
| A1B2 | cell phone | read/edit contacts<br>send/receive txt msgs<br>originate calls |
| | desktop 1 | read/edit document files<br>access Internet<br>read/write email messages |
| | desktop 2 | read document files<br>access Internet |

KEYBOARD WITH BUILT IN DISPLAY FOR USER AUTHENTICATION

CROSS REFERENCE TO RELATED APPLICATION

This application claims priority to U.S. Provisional Patent Application Serial No. 60/650,688, filed Feb. 7, 2005, which is incorporated herein by reference for all purposes.

BACKGROUND

1. Technical Field

The present invention relates to wireless communications and, more particularly, to cellular wireless communication systems and a method of call setup therefor.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Wired Local Area Networks (wired LANs), e.g., Ethernets, support communications between networked computers and other devices within a serviced area. These wired LANs often link serviced devices to Wide Area Networks and the Internet. Each of these networks is generally considered a "wired" network, even though some of these networks, e.g., the PSTN, may include some transmission paths that are serviced by wireless links.

Wireless networks have come into existence more recently. Examples include cellular telephone networks, wireless LANs (WLANs), and satellite communication networks. Common forms of WLANs, such as IEEE 802.11(a) networks, IEEE 802.11(b) networks, and IEEE 802.11(g) networks, are referred to jointly as "IEEE 802.11 networks." In a typical IEEE 802.11 network, a wired backbone couples to a plurality of wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support ad-hoc networking in which wireless terminals communicate directly to one another without the presence of an AP.

WLANs now also support voice communications via wireless voice terminals. In supporting the wireless voice terminals, the WLAN works in cooperation with a Private Branch Exchange (PBX) to interface the WLAN with the PSTN. A serviced call is routed between the PSTN and a serviced wireless voice terminal via the PBX and the WLAN. In addition to WLANs, personal area networks (PANs) are gaining in popularity. Initially conceived to reduce cabling between devices, PAN technologies, and more specifically, Bluetooth based PANs or piconets, are adding yet another wireless layer to existing networks. For example, Bluetooth radios may be embedded in wireless headsets, printers, wireless keyboards, etc., to communicatively couple a peripheral device to a network component. For example, Bluetooth may be used to wirelessly couple a wireless headset to a handset that may be used in either a cellular network or merely in a PSTN-based cordless phone. One problem not addressed in the prior art, however, relates to security relating to the wireless keyboard. For example, most computer operating systems provide an option for a user login to gain access to a computer system but do not control the specific peripherals that are used to operate the computer. As such, an owner of a wireless keyboard may readily walk to a computer having a wireless keyboard and, if the technology types match, gain access to the computer through the wireless keyboard if a login password had previously been entered or, more likely, if one is not required. Currently, security with respect to the individual wireless keyboards has not been provided. Further, for a wireless keyboard having an ability to establish connectivity with a plurality of computers or devices having wireless interfaces, no method or system has been provided to facilitate control of which devices a wireless keyboard controls or to which the wireless keyboard operatively couples. A need exists, therefore, for a wireless keyboard that provides improved security and control of computer and peripheral devices having wireless interfaces.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 9 is a table that illustrates operation of a wireless keyboard according to one embodiment of the present invention.

DETAILED DESCRIPTION OF THE DRAWINGS

Preferred embodiments of the present invention are illustrated in the figures, like numerals being used to refer to like and corresponding parts of the various drawings. Certain terms are used throughout the description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical, mechanical, or optical connection. Thus, if a first device couples to a second device, that connection may be through a direct electrical, mechanical, or optical connection, or through an indirect electrical, mechanical, or optical connection via other devices and connections. The term "computer" is used in this specification broadly and includes a personal computer, workstation, file server, or other microprocessor-based device, which can be programmed by a user to perform one or more functions and/or operations.

Figure 1:
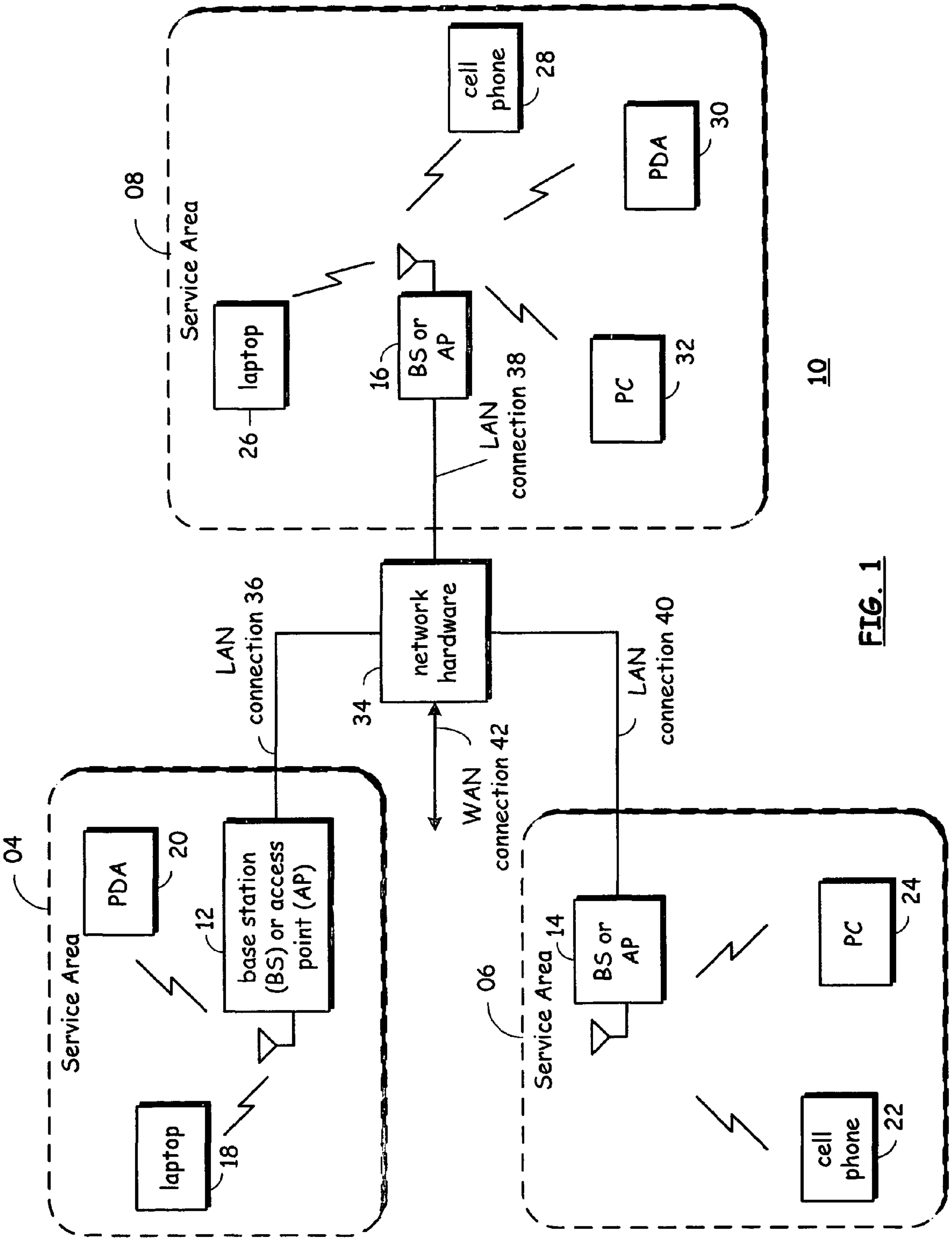
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-7.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10 to an external network element. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The embodiments of the wireless keyboard may be used to provide control and to wirelessly couple with any of the wireless devices of FIG. 1 that further include a personal area network or other second wireless interface for coupling with wireless peripheral devices such as a wireless keyboard formed according to one of the embodiments of the present invention.

Figure 2:
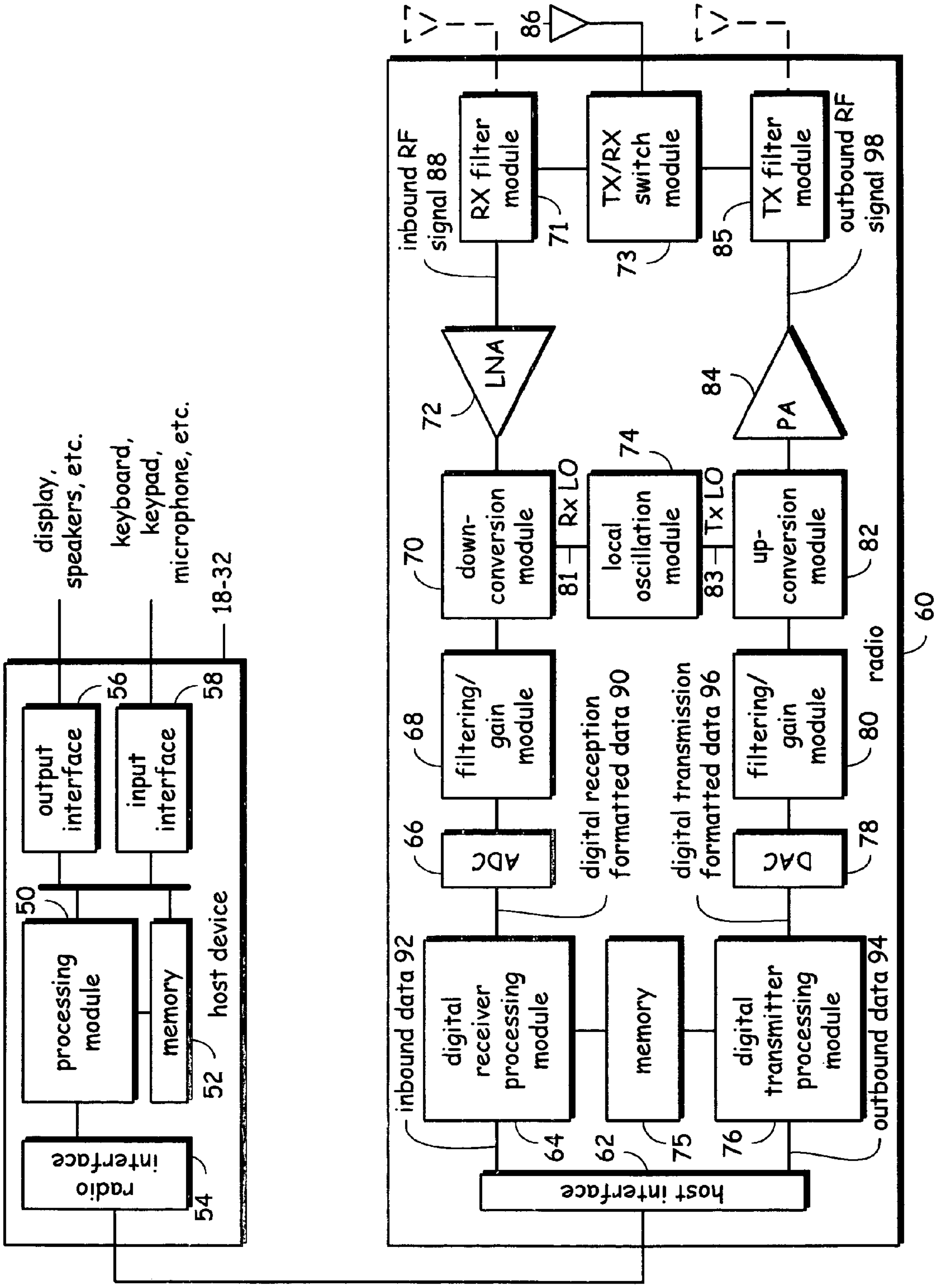
FIG. 2 is a schematic block diagram illustrating a wireless communication host device and an associated radio.

FIG. 2 is a schematic block diagram illustrating a wireless communication device 18-32 as a host device and an associated radio 60. For cellular telephone hosts, radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device, such as a display, monitor, speakers, etc., such that the received data may be displayed. Radio interface 54 also provides data from processing module 50 to radio 60. Processing module 50 may receive the outbound data from an input device, such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an up-conversion module 82, a power amplifier (PA) 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from host wireless communication device 18-32 via host interface 62. Host interface 62 routes outbound data 94 to digital transmitter processing module 76, which processes outbound data 94 in accordance with a particular wireless communication standard (e.g., IEEE 802.11a, IEEE 802.11b, Bluetooth, etc.) to produce digital transmission formatted data 96. Digital transmission formatted data 96 will be a digital baseband signal or a digital low IF signal, where the low IF typically will be in the frequency range of 100 kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via TX/RX switch module 73, where RX filter module 71 bandpass filters inbound RF signal 88. The RX filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the host wireless communication device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of host device 18-32 and digital receiver processing module 64 and digital transmitter processing module 76 of radio 60 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

The wireless communication device of FIG. 2 is one that may be implemented to include either a direct conversion from RF to baseband and baseband to RF or for a conversion by way of a low intermediate frequency. In either implementation, however, for up-conversion module 82 and down-conversion module 70, it is required to provide accurate frequency conversion. For down-conversion module 70 and up-conversion module 82 to accurately mix a signal, however, it is important that local oscillation module 74 provide an accurate local oscillation signal for mixing with the baseband or RF by up-conversion module 82 and down-conversion module 70, respectively.

Accordingly, local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency. The preceding discussion of the radio of FIG. 2 thus applies to the embodiments of the present invention and illustrate on specific embodiment of the radio circuitry that may be included in a wireless keyboard formed according to one embodiment of the present invention.

Figure 3:
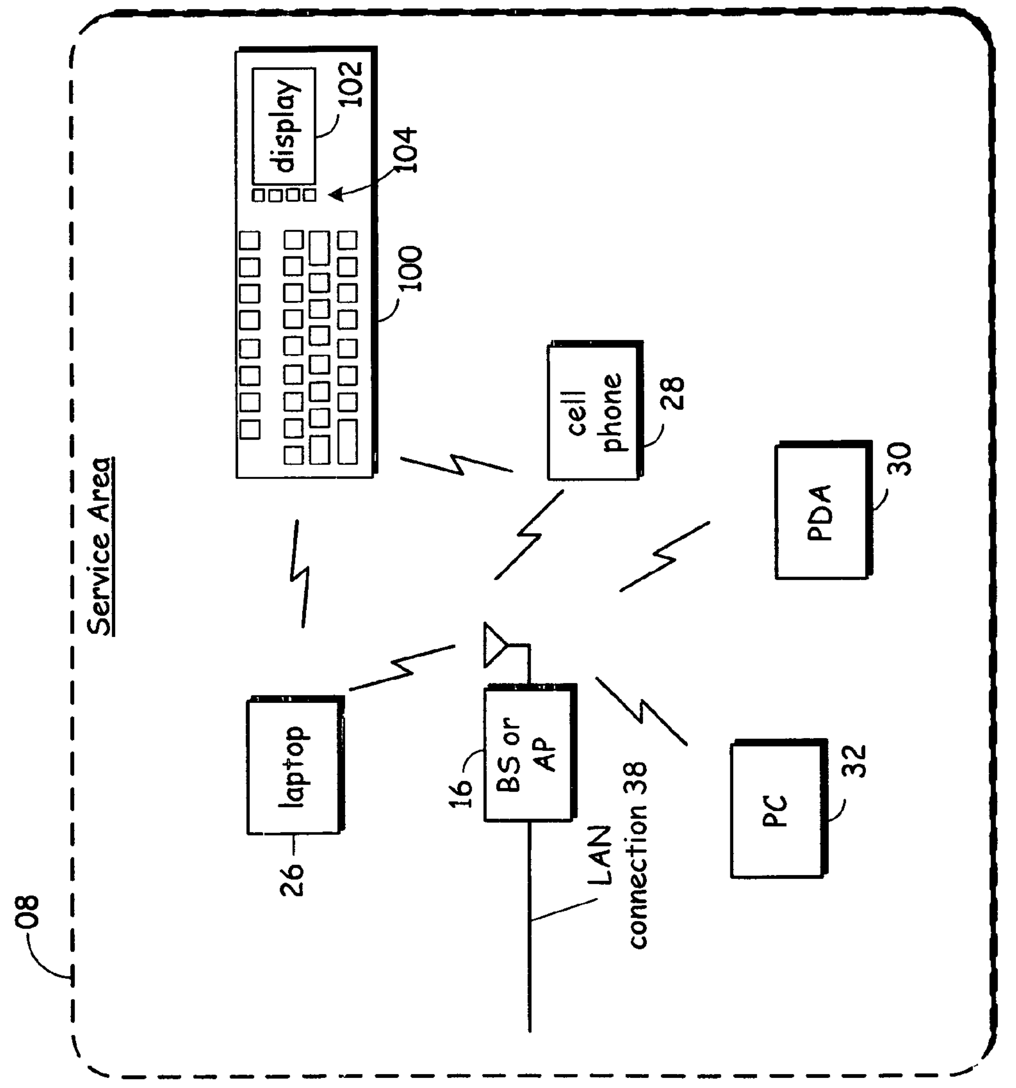
FIG. 3 is a functional block diagram of a wireless service area that includes a piconet operating according to one embodiment of the present invention.

FIG. 3 is a functional block diagram of a wireless service area that includes a wireless keyboard operating in a piconet according to one embodiment of the present invention. The service area of FIG. 3 is similar to the service areas identified in FIG. 1 but is shown to more clearly include a wireless keyboard as a device within the service area. The piconet of the example of FIG. 3 comprises a wireless coupling between a wireless keyboard 100 and at least one of a cell phone 28 and a laptop 26.

More specifically, service area 08 of FIG. 1 includes the BS or AP 16 that is operable to communicate with laptop 26, cell phone 28, PDA 30 or PC 32. BS or AP 16 is coupled by a wired connection to a network (not shown) via LAN connection 38. BS or AP 16 is illustrated as such to demonstrate that either a base station or access point may be represented thereby. In the case of a base station, cell phone 28 is operable to communicate with base station 16 via a wireless cellular communication link. If BS or AP 16 is an access point, then, for example, laptop 26, PDA 30 and PC 32 may wirelessly couple thereto via a WLAN communication channel, such as an 802.11 communication channel. Additionally, a wireless keyboard 100 is operable to communicate using a Bluetooth personal area network protocol with laptop 26 and cell phone 28 utilizing a Bluetooth communication protocol in the described embodiment of the invention. As may be seen, wireless keyboard 100 includes a display 102 having a row of adjacent buttons 104 for operatively selecting one of a list generated by the display 102 according to one embodiment of the present invention. In the described embodiment, the buttons 104 are optional.

To further appreciate the aspects of the operation illustrated in FIG. 3, it is helpful to understand Bluetooth operations. A Bluetooth radio operates using hybrid spread spectrum radio. Typically, the radio operates in a frequency-hopping manner in which the 2.4 GHz ISM band is broken into 79 1 MHz wide channels that the radio randomly hops through while transmitting and receiving data. The baseband processor of FIG. 2 controls the logic of such operation. A Bluetooth piconet is formed when one Bluetooth radio wirelessly couples or connects to another Bluetooth radio. The Bluetooth radios then hop through the 79 channels in a synchronized manner. In some applications, the Bluetooth radio system supports a large number of piconets by providing each piconet with its own set of random hopping patterns.

Bluetooth radios connect to each other in piconets, which are formed by a master radio simultaneously connecting to a plurality of slave radios. Generally, a Bluetooth radio is able to operate as a master or slave radio. A piconet configuration is determined at the time of formation. Typically, a connecting radio will often become the master; though a "master/slave swap" function allows the roles to be reversed.

To form a piconet, the Bluetooth radio utilizes a unique "Global ID" that is used to create a hopping pattern. A master radio shares its Global ID with the other radios (slaves) to provide all the radios with the correct hopping pattern to establish a piconet. The master also shares a clock offset value with the slaves of the piconet to coordinate timing for the hopping.

Radios that are not connected to the piconet may operate in a "Standby" mode. In a Standby mode of operation, a radio is not connected to the piconet but is powered ON and available. The radio listens for a request transmitted by another radio to form a piconet ("Page"). When a radio issues an Inquire command, listening radios will respond with their Global ID and clock offset, providing the inquiring radio with a list of Bluetooth radios in the area.

To form a piconet, a Bluetooth radio pages another radio with its Global ID (obtained by a previous inquiry). The paged radio responds with its Global ID. The master radio then passes the paged radio an FHS packet. The paged radio then loads the paging radio's Global ID and clock offset, thus joining the master's piconet.

A connected Bluetooth radio is assigned a 3-bit Active Member Address (AMA). To enable radios to maintain a connected state with the piconet (maintain the piconets hopping pattern and offset) while maintaining a very low-power state. Bluetooth radios can be placed in the Park, Hold, and Sniff states. For the Hold and Sniff states, radios wake up at specified intervals but remain in a power down or low-power state at other times. In the Sniff state, the Bluetooth radio is operable to transfer data at a specified interval (for example, a keyboard might be told to send/receive data every 20 slots). In the Park state, the radio remains in a low-power mode and is given the Passive Member Address (PMA) address. A Parked radio typically generates sufficient power to detect a Beacon interval for commands from the master to become an active member, to determine if any parked device wishes to become an active member, or to determine if any broadcast data has been or is being transmitted.

At a link layer, the Bluetooth radio system provides Authentication, Encryption, and Key Management of the various keys involved. Authentication involves the user providing a Personal Identification Number (PIN) that is translated into a 128-bit link key that can be authenticated in a one- or two-way direction. Once two radios are authenticated, the link can be encrypted at various key lengths (up to 128-bits in 8-bit key increments.

Referring back to FIG. 3, in view of the above description of Bluetooth operations, the wireless keyboard 100 is therefore able to operate as a master or as a slave in a personal area network that includes either laptop 26 or cell phone 28 in a manner as described above. Moreover, as wireless keyboard 100 establishes a personal area network with either device, it generates a PIN that is used to authenticate the coupling. One shortfall heretofore, however, has been that a user of a wireless keyboard may create a PAN with a device without any additional authorization. Thus, for example, an individual may bring a previously registered keyboard into proximity with another Bluetooth device and have access to that device if the keyboard had previously been set up with that device. While having an incorporated Bluetooth radio in the wireless keyboard is advantageous, it has a shortcoming in that prior systems have not provided any manner for controlling the access and the devices to which the keyboard attaches or with which the keyboard couples in a personal area network.

According to one aspect of the embodiments of the present invention, therefore, wireless keyboard 100 includes display 102 that may be used for many different functions, including authenticating a password master that creates accounts for the wireless keyboard and associating other devices with the wireless keyboard in relation to the various passwords. This capability facilitates a more secure use of a wireless keyboard that has been authenticated for at least one device. For example, a master password may be used to allow one user of wireless keyboard 100 to have access only to laptop 26, while another user is allowed to have access to both laptop 26 and cell phone 28. Accordingly, the wireless keyboard 100 may be left for use by others, while its actual connectivity and access is restricted in a defined manner. Unlike prior systems, the access control is performed by and within the keyboard rather than the device with which the wireless keyboard connects.

As an additional aspect of the embodiment of the present invention, display 102 of wireless keyboard 100 may be used to prompt the user to create the passwords and to define access for the corresponding passwords. Moreover, display 102 may be used to provide a level of control not seen before now. Specifically, a user having appropriate access rights may choose whether to couple with laptop 26 or cell phone 28 if both devices are within a distance for which a connection may be had. Specifically, display 102 may be used to display an identifier for each of laptop 26 and cell phone 28 to enable the user to select the device to which the keyboard will couple. Additionally, as yet another aspect of the embodiment of the present invention, display 102 may be used to display specific operational control commands for the selected device. For example, with respect to cell phone 28, display 102 may be used to transmit and receive text messages over the Bluetooth communication link to cell phone 28 for further transmission to a cellular network over a cellular communication link. Alternatively, a text message, for example, a short message service message, received by cell phone 28 from a cellular network may be produced to wireless keyboard 100 for display on display 102.

In one embodiment of the invention, wireless keyboard 100 is operable to display menu-driven options on display 102, which menu-driven options are selectable either by use of standard keyboard switch depressions, for example, the up and down arrows in conjunction with the enter key, or alternatively, by use of specified selection buttons. In the described embodiment of the invention, wireless keyboard 100 includes a column of specified selection buttons 104 that are placed adjacent to display 102 and may be used to select items displayed on a corresponding row of display 102.

Moreover, while display 102 may be used merely as a dumb display, in the described embodiment of the invention, wireless keyboard 100 is operable as an intelligent device with its own functionality and is operable to generate text for display on display 102 to prompt a user to make control selections or to assist the user in performing a desired function such as generating a text message prior to transmission to another device (e.g., a cell phone for further transmission as a text message in a legacy text message protocol through a cellular network). For example, with respect to generating text messages, wireless keyboard 100 is operable to independently generate the text message after being typed and displayed on display 102. Thus, the user would select transmission of the text message once complete over a Bluetooth communication link to cell phone 28 for further transmission to a cellular network in a legacy text message format, such as the SMS messaging formats.

Figure 4:
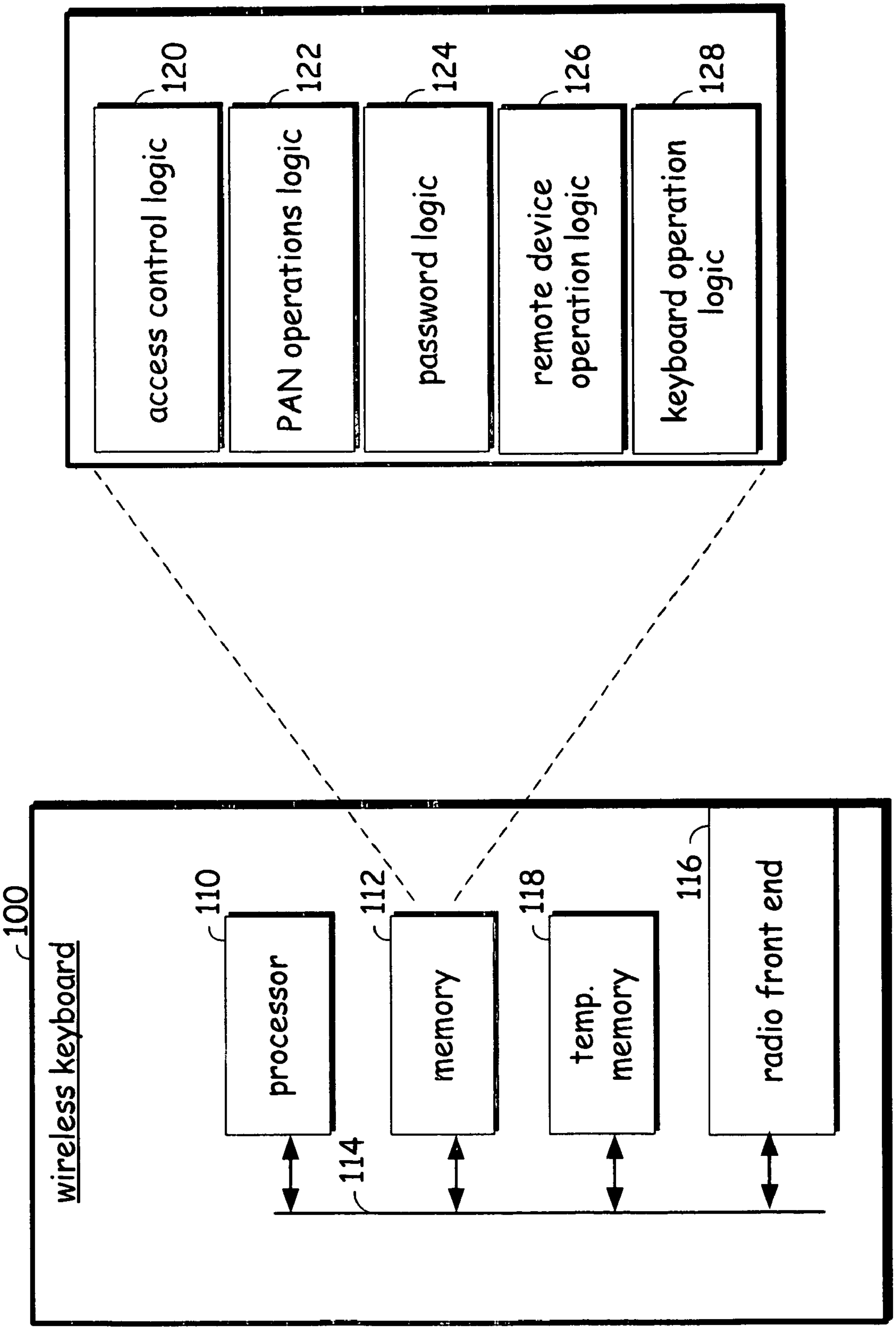
FIG. 4 is a functional block diagram of a wireless keyboard formed according to one embodiment of the present invention.

FIG. 4 is a functional block diagram of a wireless keyboard formed according to one embodiment of the present invention. As may be seen, wireless keyboard 100 includes a processor 110 that is coupled to receive computer instructions stored in memory 112 by way of an internal bus 114. Memory 112 includes computer instructions that define the operational logic of the wireless keyboard 100, including access control logic, personal area network operations logic, password logic, remote device operation logic and keyboard operation logic. As processor 110 executes the computer instructions stored in memory 112, wireless keyboard 100 may transmit or receive wireless communications by way of a radio front end 116. Processor 110, for example, transmits digital signals to radio front end 116 by way of bus 114 for transmission therefrom. In the process of executing the logic defined within memory 112, processor 110 will temporarily store data within temporary memory 118 and will retrieve said data from temporary memory 118 over bus 114.

Memory 112 includes a plurality of memory portions that include computer instructions that define specific logic or functionality. For example, a portion 120 includes computer instructions that define access control logic, while a portion 122 includes computer instructions that define PAN operations logic. Similarly, a third portion 124 includes computer instructions that define password logic, while a fourth portion 126 and a fifth portion 128 include computer instructions for defining remote device operation logic and keyboard operation logic, respectively. The access control logic, defined by the computer instructions within portion 120, defines logic for prompting a user on a display integrated on the wireless keyboard to enter an access code provided with the wireless keyboard. Typically, such access control logic is for enabling the wireless interface of the wireless keyboard only once a master password has been created. Accordingly, portion 124 that includes password logic then defines computer instructions for enabling a user of the master password to create additional passwords and to define associated access privileges. For example, the user of the master password may limit, on a password by password, what devices may be accessed with the wireless keyboard and the level of access provided therefor.

The portion 122 of memory that defines the PAN operations logic includes computer instructions that define routine, in this example, Bluetooth personal area network protocol operations, including the creation of personal area networks and operation therein according to Bluetooth protocols as described previously. A fourth portion 126 that defines remote device operation logic specifically includes computer instructions that relate to specified remote devices. For example, portion 126 includes computer instructions that facilitate the wireless keyboard generating and receiving text messages from a cell phone or to a cell phone. Moreover, the remote device operation logic within portion 126 is operable to provide corresponding user selectable options that relate to a specified device. Thus, as a user selects from a plurality of devices that are present and available for communication through a PAN, the remote device operation logic will determine what user options to display on the integrated keyboard display based on the selected device. Portion 128 merely includes keyboard operation logic that relates to traditional functionality of a wireless keyboard including, for example, logic for processing keystrokes, as well as logic for driving the integrated display of the wireless keyboard.

Figure 5:
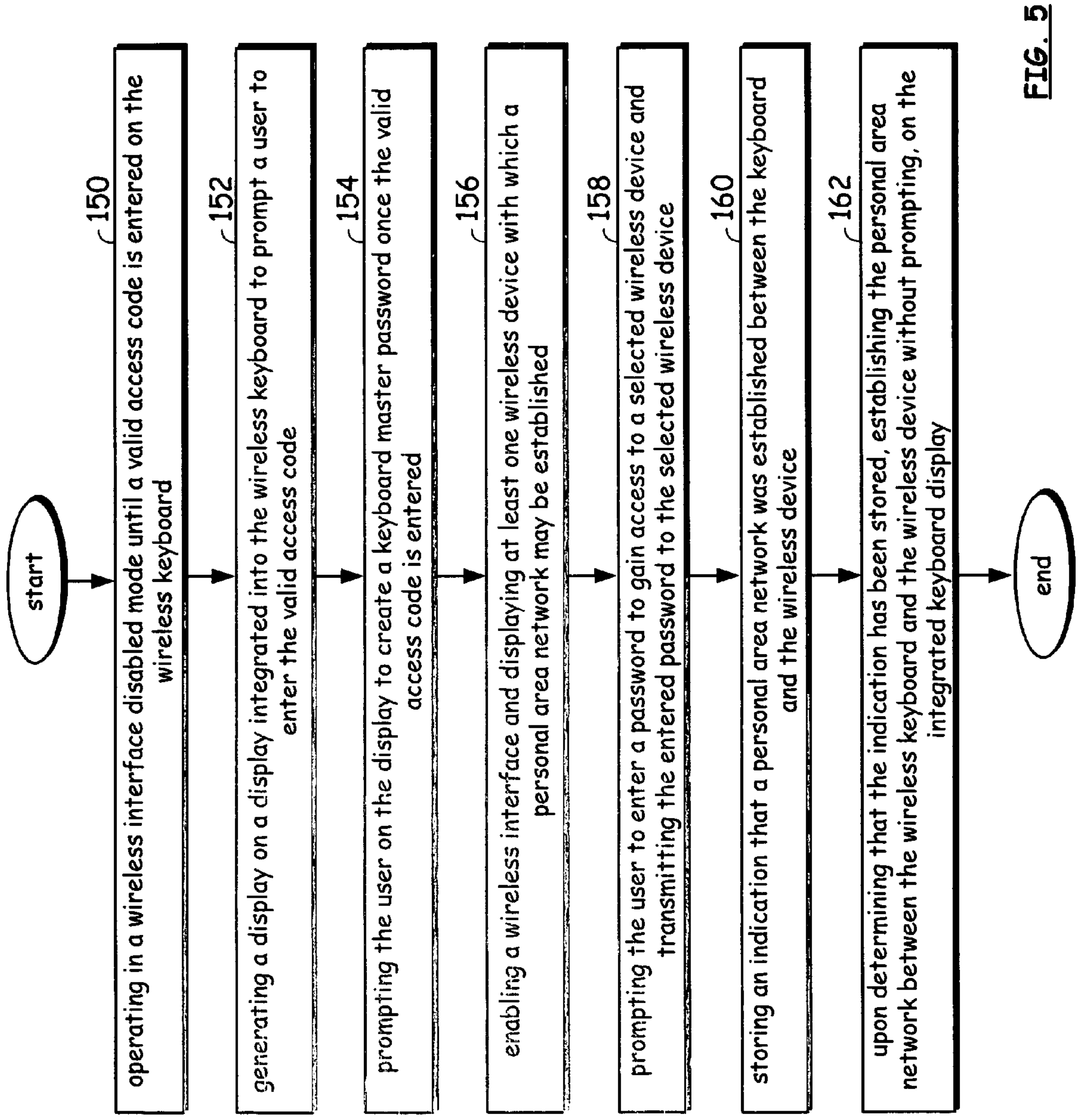
FIG. 5 is a flowchart that illustrates a method according to one embodiment of the present invention.

FIG. 5 is a flowchart that illustrates a method according to one embodiment of the present invention. Generally, the method of FIG. 5 is for integrating a wireless keyboard with one of a personal area network or a wireless local area network according to one embodiment of the present invention. In the described embodiment, the wireless keyboard is integrated with a personal area network according to a Bluetooth protocol. Initially, the method includes operating in a wireless interface disabled mode until a valid access code is entered on the wireless keyboard (step 150). Stated more simply, the wireless interface is disabled until a valid access code provided to a new user of the wireless keyboard is correctly entered into the wireless keyboard. The method further includes generating a display on a display which is integrated into the wireless keyboard to prompt a user to enter the valid access code (step 152). In one embodiment of the invention, the generated display is a text message to prompt the user to enter the valid access code. Alternatively, however, a graphic image may be displayed to prompt the user to enter the valid access code. Once a valid access code is entered, the method includes prompting the user to create a keyboard master password (step 154). In the described embodiment of the invention, the user is prompted on the integrated display.

After a valid access code is entered, the method according to the described embodiment of the invention includes enabling the wireless interface and displaying at least one wireless device with which a personal area network may be established (step 156). Enabling the wireless interface generally includes activating a radio front end and performing, in the described embodiment, Bluetooth protocol operations to detect a present device and to take preliminary steps to establish a wirelessly coupled communication with the wireless device. Thereafter, the method includes prompting the user to enter a password to gain access to a selected wireless device and transmitting the entered password to the selected wireless device (step 158). This step, of course, is optional and is required only for those selected wireless devices that require a password for access. Once a trusted link is established between the wireless keyboard and a selected wireless device, the method includes storing an indication that a personal area network, which is trusted, was established between the wireless keyboard and the wireless device (step 160). Accordingly, at a later time, when the wireless keyboard determines that a newly detected wireless device has previously established a personal area network connection with the wireless keyboard by examining the stored indication, the method includes establishing the personal area network between the wireless keyboard and the wireless device without prompting the user on the integrated keyboard display to enter the password required to access the wireless device (step 162). This method step presumes that a user enters a password to log into the wireless keyboard. As such, if the wireless keyboard had previously established a link with the external device under the password most recently used as a login password to the wireless keyboard, then no further logging in to the wireless device is necessary. Accordingly, the wireless keyboard includes logic to store the indication that the personal area network was previously established with the wireless keyboard and wireless device under the specified user password.

Figure 6:
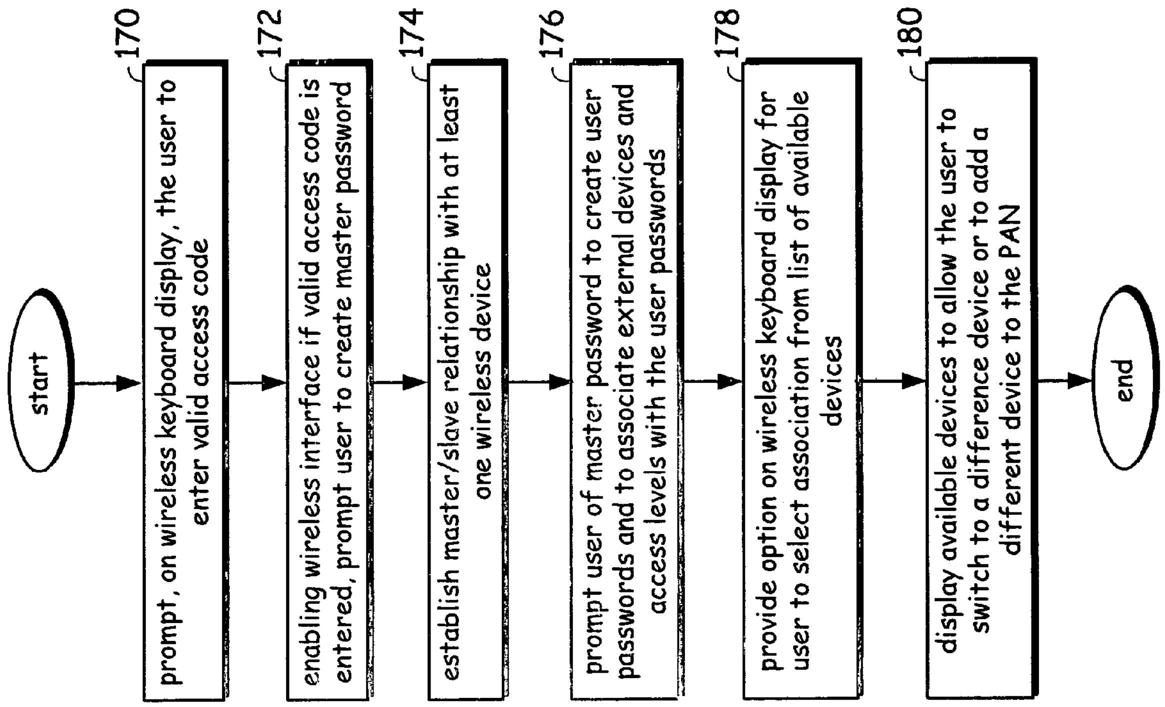
FIG. 6 is a method illustrating one method according to the described embodiment of the invention.

FIG. 6 is a method illustrating one method according to the described embodiment of the invention. The inventive method of FIG. 6 includes initially prompting, on wireless keyboard display, the user to enter valid access code (step 170). Thereafter, the method includes enabling wireless interface if valid access code is entered, prompt user to create master password (step 172). After enabling the wireless interface, the method according to the described embodiment includes establish master/slave relationship with at least one wireless device (step 174). Additionally, either before, during or after the step of establishing a master/slave relationship with at least one wireless device, the method includes prompting the user of the master password to create user passwords and to associate external devices and access levels with the user passwords (step 176).

Associating external devices and access levels is a preliminary step performed by, in one embodiment, the user signed in with the master password. In an alternate embodiment, an individual user may also create associations assuming the user has required passwords to access particular device if so required. After the associations are created by any manner, the method according to the described embodiment includes providing a selectable option on the wireless keyboard display for the user to select a device for wirelessly coupling in a PAN from list of available devices (step 178). Finally, the method includes continuing to display available devices to allow the user to switch to a difference device or to add a different device to the PAN (step 180).

Figure 7:
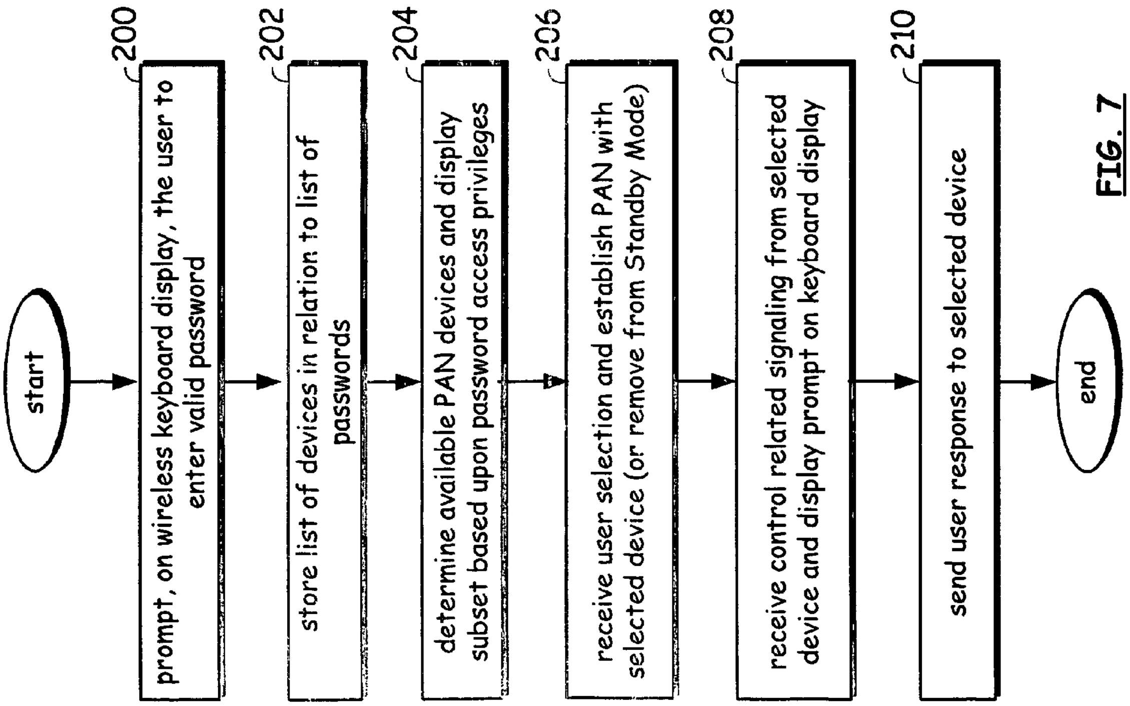
FIG. 7 is a flowchart illustrating an aspect of the embodiment of the present invention.

FIG. 7 is a flowchart illustrating an aspect of the embodiment of the present invention. Initially, the method includes prompting the user, on a wireless keyboard display, to enter a valid password (step 200). Under a master password, in one embodiment of the invention, the method includes the wireless keyboard storing a list of devices in relation to list of passwords (step 202). Thereafter, when a user accesses the wireless keyboard by entering a valid user password, the wireless keyboard determines available PAN devices and displays subset of the list of devices based upon password access privileges (step 204). A user then selects at least one device with which a PAN is to be established. Thus, the wireless keyboard receives the user selection and establishes the PAN with selected device (step 206). For example, a user may select a device know to be present but in a Standby mode as described above. Optionally, the wireless keyboard may receive control related signaling from selected device and display a corresponding prompt on the keyboard display (step 208). In such a situation, the described method thus includes the wireless keyboard sending the user response to selected device to facilitate the user device providing access to the device (step 210).

Figure 8:
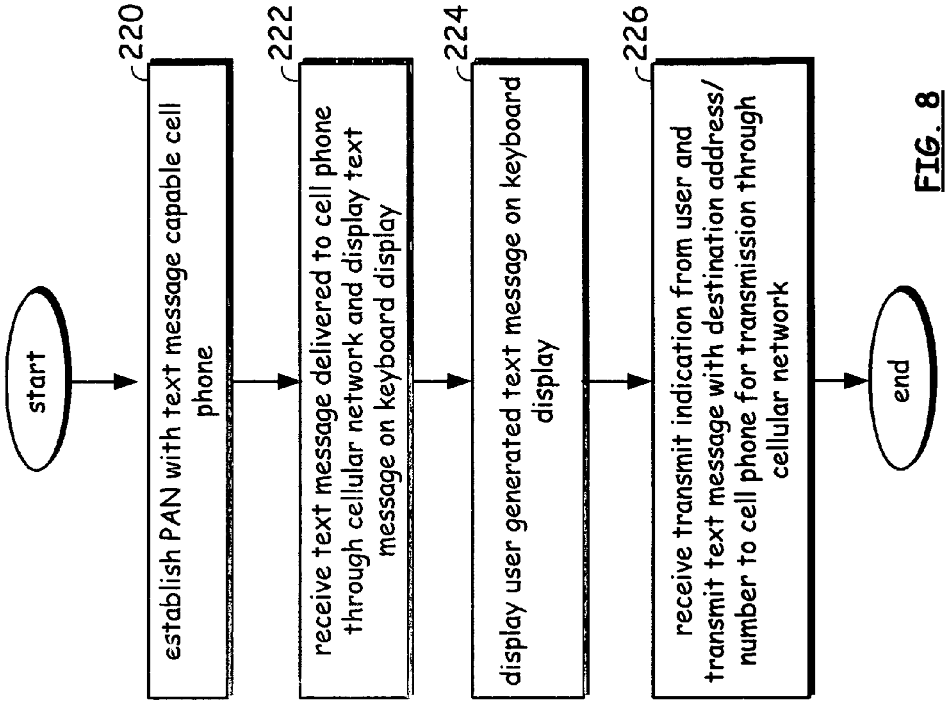
FIG. 8 is a flowchart illustrating a method for text messaging according to one aspect of the embodiments of the present invention.

FIG. 8 is a flowchart illustrating a method for text messaging according to one aspect of the embodiments of the present invention. Initially, the method includes the wireless keyboard establishing a PAN with a text message capable cell phone (step 220). Presuming that the cell phone receives a text message through a legacy text message cellular network protocol that was intended for the cell phone, the method according to the embodiment of the present invention further includes receiving, from the cell phone, the text message and displaying the text message on the keyboard display, which text message delivered to cell phone through cellular network (step 222). For an outgoing text message, the embodiment of the present invention includes displaying a user generated text message on the keyboard display as the text message is generated (step 224). Finally, for the outgoing text message, the method includes receiving a transmit or send indication from the user and transmitting the text message with a destination address or phone number to the cell phone for transmission through the cellular network in a legacy text message protocol (step 226).

FIG. 9 is a table that illustrates operation of a wireless keyboard according to one embodiment of the present invention. As may be seen, column 250 includes user passwords that are mapped in relation to devices for which access is allowed (column 252) and corresponding access privileges for the corresponding devices (column 254). Thus, a user that logs into the wireless keyboard with the password of row 256 is a user of the master password based upon the access privileges shown in column 254. The user ID shown in row 258, on the other hand, is allowed to access both the cell phone and the desktop computer 1 as shown in column 252. The access privileges, however, are limited as shown in column 254. Similarly, the user of the password of row 260 is allowed access to the cell phone and to desktop computer 1 as is the user of the password of row 258. Here, however, the access privileges are different in that editing of contacts and document files are allowed. Additionally, this user has access to desktop 2 but only with read privileges.

Generally, the table of FIG. 9 illustrates that a keyboard includes logic for creating, storing, and operating according to a mapping of user IDs in relation to allowed devices for access and corresponding access privileges. In one embodiment of the invention, the integrated display of the wireless keyboard is operable to at least display what devices may be accessed for a specified user ID (for example, the one with which a user is logged in). As an additional aspect, the display is further used to list access privileges for a given device.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. For example, any known telephone protocol may be utilized for establishing any of the described telephone links. As may be seen, therefore, the described embodiments may be modified in many different ways without departing from the scope or teachings of the invention.

The invention claimed is:

1. A method within a wireless keyboard for integrating the wireless keyboard with one of a wireless personal area network or a wireless local area network, comprising:

generating display signals for a display that is integral to the keyboard to prompt a keyboard user to enter a valid access code;

the wireless keyboard determining to operate in a wireless interface disabled mode until a valid access code is typed onto a keypad of the wireless keyboard;

receiving a sequence of key entries made upon the wireless keyboard;

determining if the valid access code was entered by the keyboard user;

if the keyboard user did enter the valid access code, enabling a wireless interface to operate in a wireless interface enabled mode;

defining a password for a keyboard master after determining that the valid access code has been entered by prompting the user on the display to create a keyboard master password; and wherein:

the wireless keyboard determines to operate in a wireless interface enabled mode once the valid access code is typed onto the keypad of the wireless keyboard; and the wireless keyboard, when operating in the wireless interface enabled mode, communicates using a personal area network protocol.

2. The method of claim 1 further including, after the wireless interface is enabled, displaying at least one wireless device with which a personal area network may be established.

3. The method of claim 2 further including transmitting an access request to a selected wireless device.

4. The method of claim 3 further including prompting the user to enter a password to gain access to a selected wireless device and transmitting the entered password to the selected wireless device.

5. The method of claim 4 further including receiving an indication that a personal area network has been established with the wireless keyboard whereby the wireless device is operable to establish the personal area network only upon receiving a valid password.

6. The method of claim 5 further including storing an indication that a personal area network was established between the wireless keyboard and the wireless device.

7. The method of claim 6 further including wirelessly detecting that the wireless device is present and, based upon determining that the indication has been stored, establishing the personal area network between the wireless keyboard and the wireless device without prompting, on the integrated wireless keyboard display, the user to enter a password to establish the personal area network with the wireless device.

8. A method for integrating a wireless keyboard with one of a wireless personal area network or a wireless local area network, comprising:

the wireless keyboard generating a display on a display integrated into the wireless keyboard to prompt a user to enter a valid access code wherein the display is generated solely by the wireless keyboard;

receiving a sequence of key entries;

comparing the sequence of key entries to a valid access code;

if the sequence of key entries match the valid access code, defining a password for a keyboard master after determining that the valid access code has been entered by prompting the user on the display to create a keyboard master password;

the wireless keyboard determining to enable a wireless interface of the wireless keyboard to operate in a wireless interface enabled mode; and establishing a communication link with at least one other wireless device based upon determining that the valid access code has been entered and at one of:

a communication link using a WLAN protocol standard has been successfully established;

a communication link using a personal area network protocol standard has been successfully established; and a communication link using an infrared communication protocol has been successfully established.

9. The method of claim 8 further including, for the at least one other wireless device, prompting the user of the keyboard master password to create at least one password for access to the at least one other wireless device.

10. The method of claim 9 further including prompting the user of the keyboard master password to create a plurality of passwords and corresponding access levels for a plurality of other wireless devices.

11. The method of claim 10 wherein each created password of the plurality of passwords has an associated list of wireless devices of the plurality of other wireless devices for which access is allowed.

12. A wireless keyboard, comprising:

an integrated display for displaying messages and status indications to a keyboard user;

a wireless front end for transmitting and receiving communication signals with one of an access point or a Bluetooth enabled wireless device; and a processor with memory having instructions for defining associated logic, that when executed by the processor, causes the wireless keyboard to:

operate in a wireless interface disabled mode until a valid access code is typed onto a keypad of the wireless keyboard;

receive a sequence of key entries made upon the wireless keyboard;

determine if the valid access code was entered by the keyboard user;

if the keyboard user did enter the valid access code, enable a wireless interface to operate in a wireless interface enabled mode;

define a password for a keyboard master after determining that the valid access code has been entered by prompting the user on the display to create a keyboard master password; and when operating in the wireless interface enabled mode, communicate using a personal area network protocol.

13. The wireless keyboard of claim 12 further including logic for prompting the user through the integrated wireless keyboard display to create a password for a keyboard master.

14. The wireless keyboard of claim 13 further including logic for enabling a wireless interface after a keyboard master password is created, and for displaying at least one wireless device with which a personal area network may be established.

15. The wireless keyboard of claim 13 further including logic for prompting the user to enter a password to gain access to a selected wireless device and transmitting the entered password to the selected wireless device.

16. The wireless keyboard of claim 15 further including logic for prompting the user of the keyboard master password to create a plurality of passwords and corresponding access levels for a plurality of other wireless devices.

17. The wireless keyboard of claim 16 wherein the wireless keyboard is operable to define a plurality of personal area networks for each password and, whenever a user password is entered, to provide a list of access devices for selection for which the wireless keyboard may wirelessly couple.

* * * * *